(12) United States Patent
Loftus et al.

(10) Patent No.: US 9,506,356 B2
(45) Date of Patent: Nov. 29, 2016

(54) COMPOSITE RETENTION FEATURE

(71) Applicants: Rolls-Royce Corporation, Indianapolis, IN (US); Rolls-Royce North American Technologies, Inc., Indianapolis, IN (US)

(72) Inventors: Peter Loftus, Greenwood, IN (US); Adam L. Chamberlain, Mooresville, IN (US); Ted J. Freeman, Danville, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 455 days.

(21) Appl. No.: 14/094,304

(22) Filed: Dec. 2, 2013

(65) Prior Publication Data

US 2015/0044054 A1 Feb. 12, 2015

Related U.S. Application Data (60) Provisional application No. 61/789,937, filed on Mar. 15, 2013.

(51) Int. Cl.
| | |
|---|---|
| *F01D 5/30* | (2006.01) |
| *F01D 5/04* | (2006.01) |
| *F01D 9/04* | (2006.01) |
| *G01P 15/18* | (2013.01) |
| *E21B 45/00* | (2006.01) |
| *E21B 44/00* | (2006.01) |

(52) U.S. Cl.
CPC .............. *F01D 5/3007* (2013.01); *E21B 44/00* (2013.01); *E21B 45/00* (2013.01); *F01D 5/3084* (2013.01); *F01D 9/04* (2013.01); *G01P 15/18* (2013.01); *F05D 2230/237* (2013.01); *Y10T 29/49337* (2015.01)

(58) Field of Classification Search
CPC ...... F01D 5/30; F01D 5/3007; F01D 5/3053; F01D 5/3061; F01D 5/3084; F01D 5/3092; F01D 5/32; F01D 5/323; F01D 5/326; F01D 9/02; F01D 9/04; F01D 11/003; F01D 11/08; F01D 11/12; F01D 11/122; F05D 2240/11; F05D 2240/30; F05D 2230/237
See application file for complete search history.

(56) References Cited

U.S. PATENT DOCUMENTS

| | | | | |
|---|---|---|---|---|
| 3,720,480 A | * | 3/1973 | Plowman ................ | F01D 5/323 416/220 R |
| 3,749,518 A | * | 7/1973 | Alver ...................... | F01D 5/147 416/219 R |
| 3,752,600 A | * | 8/1973 | Walsh ..................... | F01D 5/282 415/217.1 |
| 3,756,745 A | * | 9/1973 | Alver ...................... | F01D 5/282 416/219 R |
| 3,765,791 A | * | 10/1973 | Trappmann ............. | F01D 9/042 415/131 |
| 3,784,320 A | | 1/1974 | Rossman et al. | |
| 3,942,231 A | * | 3/1976 | Whitaker ................ | B23P 15/04 228/193 |
| 4,040,770 A | * | 8/1977 | Carlson .................. | C22C 47/00 244/131 |
| 4,111,606 A | * | 9/1978 | Prewo .................... | C22C 47/00 416/224 |

(Continued)

*Primary Examiner* — Richard Edgar
*Assistant Examiner* — Christopher R Legendre
(74) *Attorney, Agent, or Firm* — Barnes & Thornburg LLP (57) ABSTRACT

A retention feature for use in a gas turbine engine is disclosed herein. The retention feature includes a ceramic post, an insert, and a braze layer coupling the insert to the ceramic post. The ceramic post includes a body adapted to be coupled to a turbine engine component and a head coupled to the body. The insert is arranged in a space formed in the head and the braze layer extends from the ceramic post to the insert to bond the insert to the ceramic post.

16 Claims, 6 Drawing Sheets

(56) References Cited

U.S. PATENT DOCUMENTS

| | | | |
|---|---|---|---|
| 4,471,008 A | 9/1984 | Huther | |
| 4,728,257 A * | 3/1988 | Handschuh | F01D 11/24 415/136 |
| 4,802,824 A | 2/1989 | Gastebois et al. | |
| 5,100,292 A * | 3/1992 | Matula | F01D 5/30 416/220 R |
| 5,160,243 A | 11/1992 | Herzner et al. | |
| 5,228,828 A * | 7/1993 | Damlis | F01D 11/22 415/173.2 |
| 5,372,481 A | 12/1994 | Boyd | |
| 5,480,281 A * | 1/1996 | Correia | F01D 11/08 415/115 |
| 5,672,417 A * | 9/1997 | Champenois | F01D 5/282 416/230 |
| 6,132,175 A | 10/2000 | Cai et al. | |
| 6,290,466 B1 | 9/2001 | Ravenhall et al. | |
| 6,406,256 B1 * | 6/2002 | Marx | F01D 11/16 415/138 |
| 6,733,235 B2 * | 5/2004 | Alford | F01D 11/08 415/173.1 |
| 6,733,907 B2 * | 5/2004 | Morrison | B32B 18/00 416/241 B |
| 6,896,483 B2 * | 5/2005 | Dierksmeier | F01D 11/18 403/28 |
| 7,052,235 B2 * | 5/2006 | Alford | F01D 9/04 415/173.1 |
| 7,189,057 B2 * | 3/2007 | Lee | F01D 11/16 415/128 |
| 7,300,255 B2 * | 11/2007 | Potter | F01D 5/282 416/229 A |
| 7,488,157 B2 | 2/2009 | Marini et al. | |
| 7,871,716 B2 * | 1/2011 | Vance | F23R 3/007 416/224 |
| 8,016,565 B2 | 9/2011 | Berg et al. | |
| 8,118,546 B2 | 2/2012 | Morrison | |
| 8,333,558 B2 * | 12/2012 | Finn | F01D 21/045 415/173.1 |
| 8,568,082 B2 * | 10/2013 | Beckford | F01D 5/147 415/9 |
| 2005/0084379 A1 * | 4/2005 | Schreiber | B23H 3/00 416/230 |
| 2005/0158171 A1 * | 7/2005 | Carper | B32B 18/00 415/200 |
| 2007/0048142 A1 | 3/2007 | Dambrine et al. | |
| 2009/0016890 A1 | 1/2009 | Douguet et al. | |
| 2009/0060745 A1 | 3/2009 | Douguet et al. | |
| 2011/0206522 A1 | 8/2011 | Alvanos et al. | |
| 2012/0027605 A1 | 2/2012 | Cordier et al. | |
| 2012/0107125 A1 | 5/2012 | Reghezza et al. | |
| 2012/0177488 A1 * | 7/2012 | Corman | C04B 37/006 415/200 |
| 2013/0195633 A1 * | 8/2013 | Hildebrand | F01D 5/20 415/173.4 |
| 2015/0044049 A1 * | 2/2015 | Lamusga | F01D 11/08 416/182 |
| 2015/0044054 A1 * | 2/2015 | Loftus | G01P 15/18 416/220 R |
| 2016/0010560 A1 * | 1/2016 | Dierksmeier | F01D 5/085 60/772 |

\* cited by examiner

COMPOSITE RETENTION FEATURE

CROSS REFERENCE TO RELATED APPLICATIONS

This application claims priority to and the benefit of U.S. Provisional Patent Application No. 61/789,932, filed 15 Mar. 2013, the disclosure of which is now incorporated herein by reference.

FIELD OF THE DISCLOSURE

The present disclosure relates generally to gas turbine engines, and more specifically to dovetail features used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Turbines typically include alternating stages of static vane assemblies and rotating wheel assemblies. The rotating wheel assemblies include disks carrying blades that are coupled to the disks. When the rotating wheel assemblies turn, tips of the blades move along blade tracks included in static shrouds that are supported around the rotating wheel assemblies.

Interest in improving efficiency and reducing emissions of gas turbine engines is driving demand for components that can withstand high temperature environments. One limitation to improving the efficiency and reducing the emissions of some gas turbine engines is the temperature capability of hot section components (for example, but not limited to turbine vanes, blades, and blade tracks). Materials able to withstand high temperature environments, such as ceramic-based materials, may be considered for use in gas turbines but present design and manufacturing challenges.

SUMMARY

The present application discloses one or more of the features recited in the appended claims and/or the following features which, alone or in any combination, may comprise patentable subject matter.

According to the present disclosure, turbine engine components used in hot sections of a gas turbine engine (e.g. turbine blade airfoils, blade track runners, etc.) are made from ceramic-based materials capable of withstanding high temperatures. The turbine engine components are mounted in the gas turbine engine by retention features that extend away from the corresponding turbine engine components. The retention features are illustratively adapted to mate with corresponding features (e.g. dovetail slots, fir tree slots, etc.) formed in other engine components.

In illustrative embodiments, each retention feature includes a ceramic post, at least one insert, and at least one braze layer interconnecting the ceramic post and the insert(s). The ceramic post illustratively extends away from a turbine engine component and forms a channel facing away from the turbine engine component. The insert(s) is arranged in the channel and resists buckling of the ceramic post into the channel. The braze layer couples the insert(s) to the ceramic post and allows forces to be transmitted between the ceramic post and the insert(s).

In some illustrative embodiments, the insert(s) are made from a ceramic matrix composite material including two-dimensional sheets of reinforcing fibers. More specifically, the insert(s) are constructed from two-dimensional fabric sheets of silicon carbide fibers and a silicon carbide matrix. The two-dimensional fabric sheets are sized to cover a cross-sectional area of the channel formed by the ceramic post and are stacked to fill at least a portion of the length of the channel. The matrix suspends the two-dimensional fabric sheets in place relative to one another to form each insert.

In other embodiments, the insert(s) are made from a ceramic matrix composite material including three-dimensional sheets of reinforcing fibers. More specifically, the insert(s) are constructed from three-dimensional fabric sheets of silicon carbide fibers and a silicon carbide matrix. The three-dimensional fabric sheets are illustratively arranged to form a U-shape sized to extend along walls of the channel formed by the ceramic post and are stacked to cover only a portion of the depth of the channel. The U-shaped insert(s) are further sized to fill at least a portion of the length of the channel. The matrix suspends the three-dimensional fabric sheets in place relative to one another to form each insert.

In illustrative embodiments, the braze layer(s) are adapted to couple the insert(s) made from ceramic matrix composite material to the ceramic post. The braze layer(s) are illustratively made from a silicide including silicon and at least one of zirconium, molybdenum, hafnium, boron, and carbon. The braze layer(s) may also include inert ceramic fibers.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
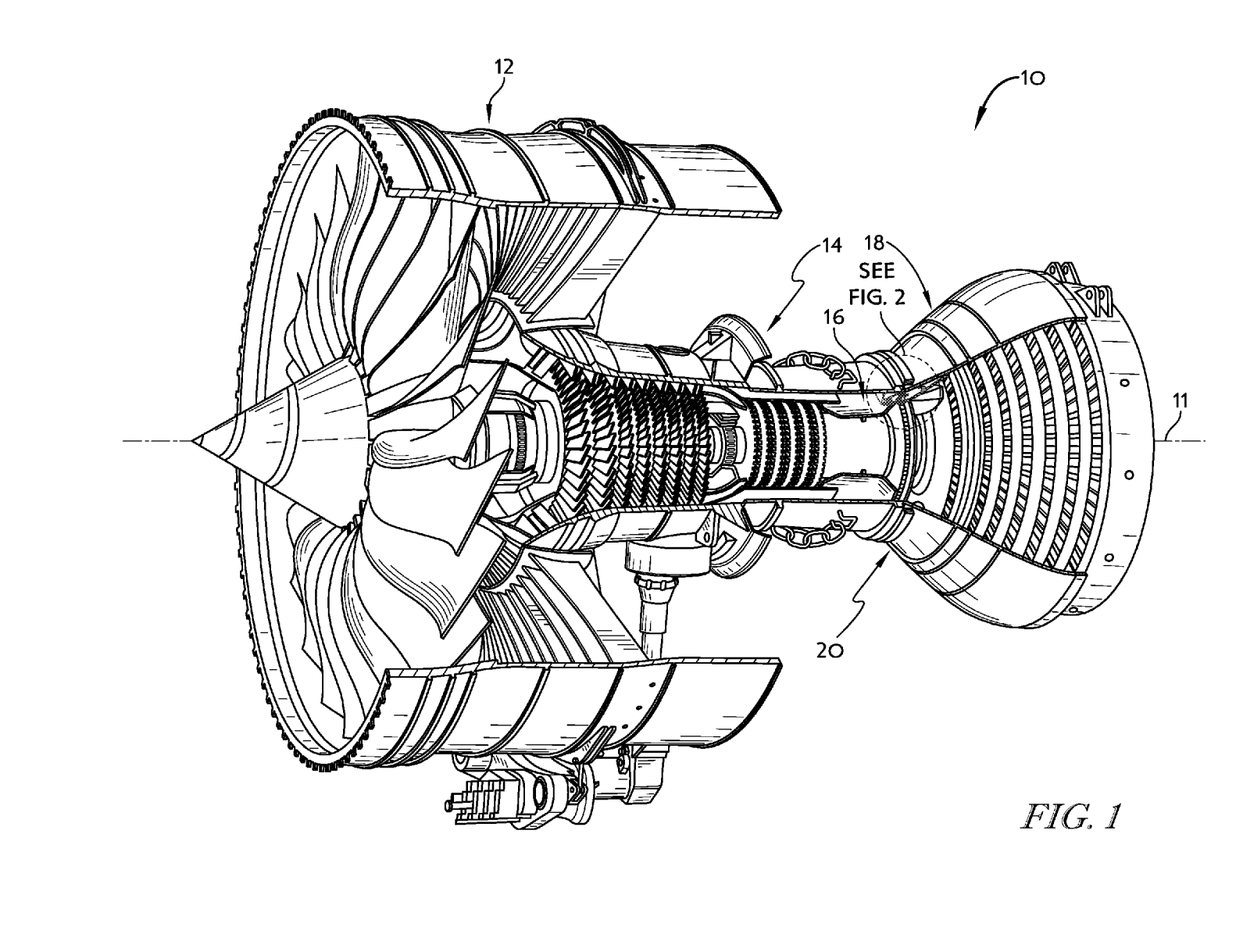
FIG. 1 is a cut-away perspective view of a gas turbine engine.

FIG. 1 is an illustrative aerospace gas turbine engine 10 cut-away to show that the engine 10 includes a fan 12, a compressor 14, a combustor 16, and a turbine 18 all mounted to a case 20. The fan 12 is driven by the turbine 18 and provides thrust for propelling an air vehicle (not shown). The compressor 14 is configured to compress and to deliver air to the combustor 16. The combustor 16 is configured to mix fuel with the compressed air received from the compressor 14 and to ignite the fuel. The hot high pressure products of the combustion reaction in the combustor 16 are directed into the turbine 18 and the turbine 18 extracts work to drive the compressor 14 and the fan 12.

Figure 2:
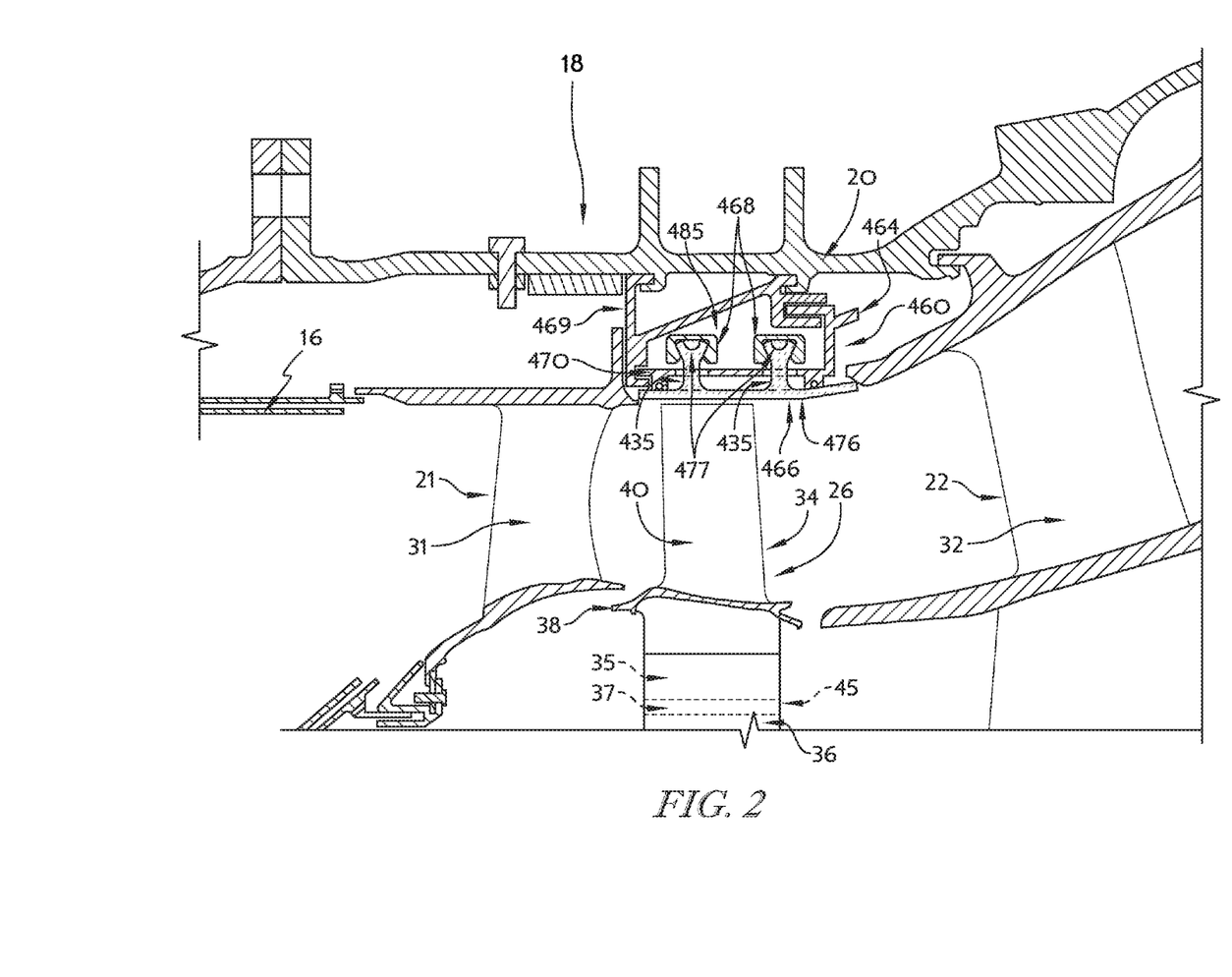
FIG. 2 is a partial cross-sectional view of the gas turbine engine of FIG. 1 showing the arrangement of a turbine wheel assembly and a turbine shroud assembly.

Referring now to FIG. 2, a portion of the turbine 18 is shown to include static turbine vane assemblies 21, 22 and a turbine wheel assembly 26. Each vane assembly 21, 22 includes a plurality corresponding of vanes 31, 32. The turbine wheel assembly 26 includes a plurality of blades 34 and a disk 36 supporting the blades 34 for rotation. The vanes 31 of the vane assembly 21 extend across the flow path of the hot, high-pressure combustion products from the combustor 16 to direct the combustion products toward the blades 34 of the turbine wheel assembly 26. The blades 34 are in turn pushed by the combustion products to cause the turbine wheel assembly 26 to rotate; thereby, driving the rotating components of the compressor 14 and the fan 12.

Figure 3:
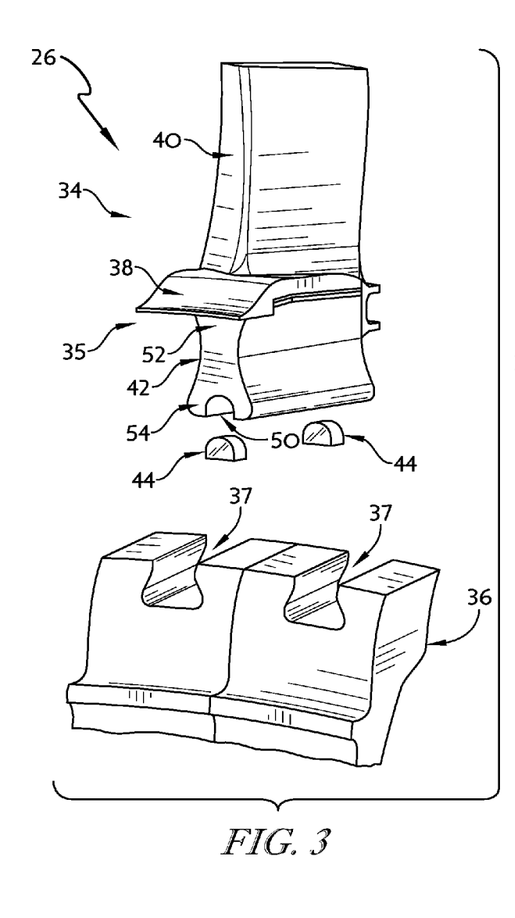
FIG. 3 is an exploded perspective view of the turbine wheel assembly of FIG. 2.

In the illustrative embodiment, the turbine blades 34 are coupled to the disk 36 by pair of complementary retaining features 35, 37 as shown in FIGS. 2 and 3. Each turbine blade 34 includes a blade retaining feature 35, a platform 38, and an airfoil 40 as shown in FIG. 3. The disk 36 is illustratively a metallic component and is formed to include a plurality of disk retaining features 37 that extend axially through the disk 36 as shown in FIG. 3. The disk retaining features 37 are configured to receive the blade retaining features 35 of each turbine blade 34 to couple the blades 34 to the disk 36. In the illustrative embodiment, the blade retaining features 35 and the disk retaining features 37 cooperate to form a dovetail-type retention system 45 when the blade retaining features 35 are inserted into the disk retaining features 37. In other embodiments, the retaining features 35, 37 of the turbine blade 34 and the disk 36 may cooperate to form a fir-tree-type retention system or another suitable retention system.

Figure 4:
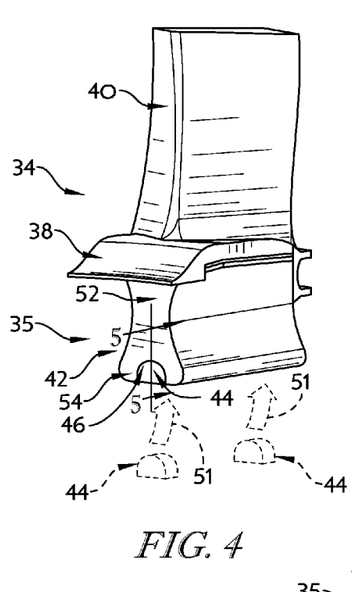
FIG. 4 is a perspective view of a turbine blade included in the turbine wheel assembly of FIG. 2.
Figure 5:
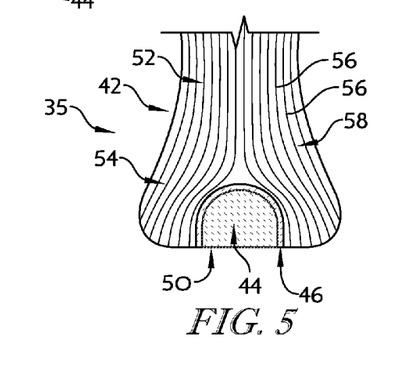
FIG. 5 is a cross-sectional view of a blade retaining feature included in the turbine blade of FIG. 4.

The blade retaining feature 35 illustratively includes a post 42 formed with the rest of the turbine blade 34, a plurality of inserts 44 coupled to the post 42, and a plurality of braze layers 46 bonding the inserts 44 to the post 42 as shown in FIGS. 4 and 5. The post 42 is illustratively Y-shaped and forms a channel 50. Each of the inserts 44 is arranged in the channel 50 to reinforce the post 42.

The post 42 illustratively includes a body 52 and a head 54 as shown in FIG. 3. The body 52 extends from the platform 38 of the turbine blade 34 away from the airfoil 40. The head 54 is coupled to the body 52 and is spaced apart from the platform 38 and the airfoil 40 of the turbine blade 34. The head 54 is formed to include the channel 50. The channel 50 illustratively extends through the head 54 in an axial direction and opens inwardly in a radial direction, facing away from the rest of the turbine blade 34.

The post 42 is illustratively made from a ceramic matrix composite material. The illustrative ceramic matrix composite material includes silicon carbide fibers formed into fabric sheets 56 and a silicon carbide matrix 58 as shown in FIG. 5. The fabric sheets 56 are illustratively arranged to extend generally inwardly in the radial direction and to bend outwardly in a circumferential direction around the channel 50 to form the Y-shape of the post 42 as shown in FIG. 5. In other embodiments, the post 42 may be made from other ceramic-based or non-ceramic-based composite materials including chopped fibers (random or directional), fiber tows, and/or unidirectional fiber tape combined with a matrix material.

Similarly, the platform 38 and the airfoil 40 of the turbine blade 34 are made from a ceramic matrix composite material, illustratively including silicon carbide fibers and a silicon carbide matrix. However, in other embodiments, the platform 38 and the airfoil 40 may be made of other ceramic-based or non-ceramic-based composite materials including reinforcing fibers and a matrix material.

The plurality of inserts 44 are illustratively spaced apart from one another along the channel 50 as suggested by arrows 51 in FIG. 4. Each insert 44 is sized to fill a portion of the channel 50 to resist buckling of the head 54 into the channel 50 due to forces applied to the head 54 induced by rotation of the turbine wheel assembly 26 during operation of the gas turbine engine 10. In the illustrative embodiment, two inserts 44 are shown arranged at opposite ends of the channel 50. In other embodiments, additional inserts 44 may be added and arranged along the channel 50.

Each insert 44 is illustratively made from a ceramic matrix composite material. The illustrative ceramic matrix composite material includes silicon carbide fibers formed into fabric sheets 56 and a silicon carbide matrix 58. The fabric sheets 56 are illustratively sized to fill a portion of the channel 50. In other embodiments, each insert 44 may be made from other ceramic-based or non-ceramic-based composite materials including chopped fibers (random or directional), fiber tows, and/or unidirectional fiber tape combined with a matrix material. In still other embodiments, each insert 44 may be made from a monolithic material.

Each of the plurality of braze layers 46 are arranged between a corresponding insert 44 and the head 54 within the channel 50 to bond the inserts 44 with the head 54 as shown in FIGS. 4 and 5. In the illustrative embodiment, the braze layers 46 are made from a silicide including at least one of zirconium, molybdenum, hafnium, boron, and carbon. In some embodiments, the braze layers 46 may include inert ceramic fibers. In other embodiments, the braze layers 46 may be made from other materials suitable for bonding the inserts 44 with the head 54.

An illustrative method of making the blade retaining feature 35 includes the manufacturing post 42 along with the platform 38 and the airfoil 40 of the turbine blade 34. The method also includes manufacturing plurality of inserts 44. Then, the inserts 44 are arranged in spaced apart relation to one another in the channel 50. When the inserts 44 are arranged in the channel 50, the plurality of braze layers 46 are deposited between the head 54 and the inserts 44 to bond the inserts 44 to the post 42 as shown in FIGS. 4 and 5.

Manufacturing the post 42 illustratively includes preforming ceramic fiber fabric sheets 56 (two-dimensional or three-dimensional) to form the body 52 and the head 54 and densifying the preformed sheets via one or more of polymer infiltration, slurry infiltration, prepreg infiltration, chemical vapor infiltration, and melt infiltration. When densification is complete, the channel 50 and final geometry of the post 42 (Y-shape) is defined by machining the densified ceramic matrix composite.

Manufacturing the inserts 44 illustratively includes cutting and preforming at least one ceramic fiber sheet into a predetermined shape sized to fill a portion of the channel 50 and densifying the preformed sheet(s). Densifying the preformed sheets includes one or more processes of polymer infiltration, slurry infiltration, prepreg infiltration, chemical vapor infiltration, and melt infiltration. When densification is complete, the final geometry of the inserts 44 is defined by machining the densified ceramic matrix composite.

In other embodiments, manufacturing the inserts 44 may include preforming and densifying a slug of composite material including reinforcing fibers and a matrix material. Then, the final geometry of the inserts 44 is defined by machining the densified slug. In still other embodiments, manufacturing the inserts 44 may include machining slugs of other stock material.

Figure 6:
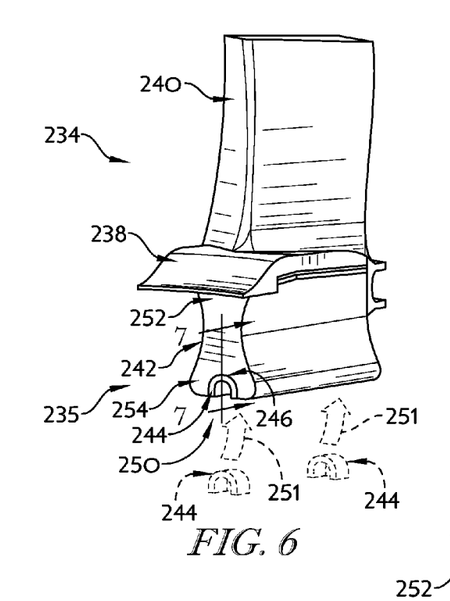
FIG. 6 is a perspective view of another turbine blade adapted for use in the turbine wheel assembly of FIG. 2.
Figure 7:
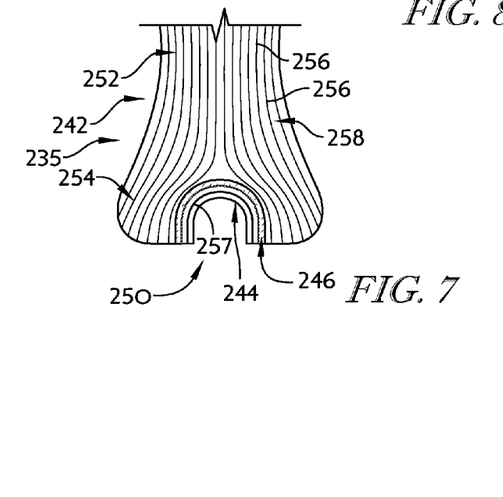
FIG. 7 is a cross-sectional view of a blade retaining feature included in the turbine blade of FIG. 6.

Another illustrative turbine blade 234 is shown in FIGS. 6 and 7. The turbine blade 234 is configured for use in engine 10 and is substantially similar to the turbine blade 34 shown in FIGS. 1-5 and described herein. Accordingly, similar reference numbers in the 200 series indicate features that are common between the turbine blade 34 and the turbine blade 234. Further the method of making the blade retaining feature 235 of the turbine blade 234 is similar to the method of making the retaining feature 35 the turbine blade 34 described herein. The description of the engine 10 and turbine blade 34 and the method of making the blade retaining feature 35 are hereby incorporated by reference to apply to the turbine blade 334, except in instances when it conflicts with the specific description and drawings of the turbine blade 334.

Unlike the turbine blade 34, the inserts 244 of the blade retaining feature 235 included in the turbine blade 234 are U-shaped as shown in FIGS. 6 and 7. Additionally, the fabric sheets 257 of the inserts 244 extend along walls of the channel 250 as shown in FIG. 7.

Figure 8:
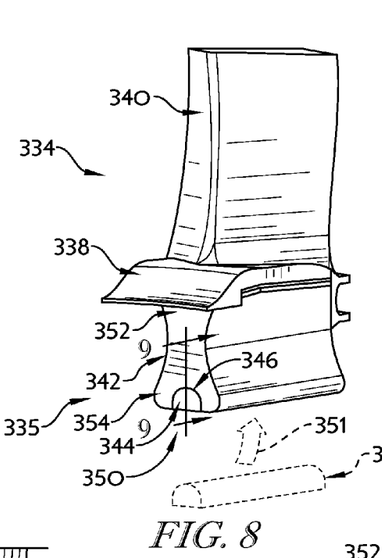
FIG. 8 is a perspective view of another turbine blade adapted for use in the turbine wheel assembly of FIG. 2.
Figure 9:
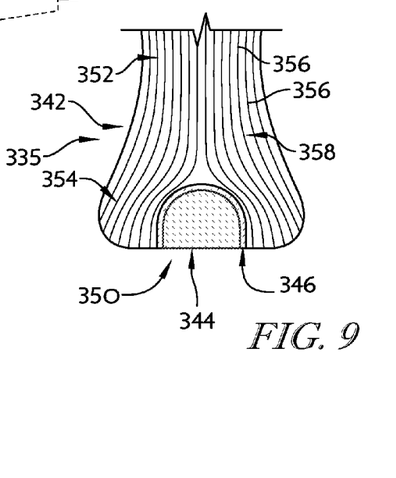
FIG. 9 is a cross-sectional view of a blade retaining feature included in the turbine blade of FIG. 8.

Another illustrative turbine blade 334 is shown in FIGS. 8 and 9. The turbine blade 334 is configured for use in engine 10 and is substantially similar to the turbine blade 34 shown in FIGS. 1-5 and described herein. Accordingly, similar reference numbers in the 300 series indicate features that are common between the turbine blade 34 and the turbine blade 334. Further the method of making the blade retaining feature 335 of the turbine blade 334 is similar to the method of making the retaining feature 35 the turbine blade 34 described herein. The description of the engine 10 and turbine blade 34 and the method of making the blade retaining feature 35 are hereby incorporated by reference to apply to the turbine blade 334, except in instances when it conflicts with the specific description and drawings of the turbine blade 334.

Unlike the turbine blade 34, the only one insert 344 is included in the blade retaining feature 335 included in the turbine blade 334 as shown in FIGS. 6 and 7. Additionally, single insert 344 is sized to extend along the entire channel 350 formed in the head 354 of the post 344. In other embodiments, the single insert 344 may be sized to extend along only a portion of the channel 350.

Figure 10:
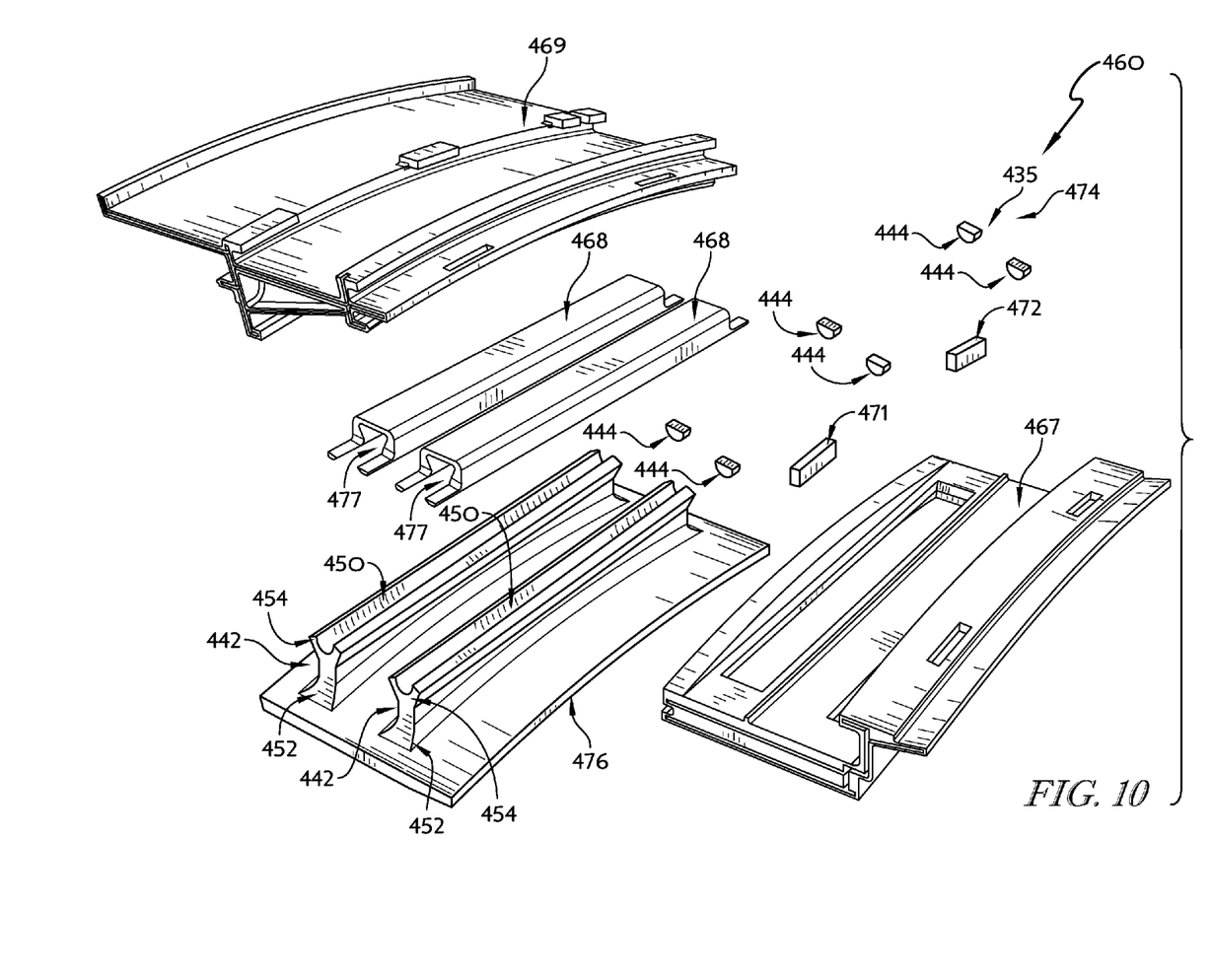
FIG. 10 is an exploded perspective view of the turbine shroud assembly of FIG. 2.

Turning now to FIG. 10, an exploded perspective view of a turbine shroud assembly 460 included in the turbine 18 is shown. The turbine shroud assembly 460 includes with a turbine blade track 466 that extends around turbine wheel assembly 26 to block combustion products from passing over the blades 34 without pushing the blades 34 to rotate as shown in FIG. 2. Combustion products that are allowed to pass over the blades 34 do not push the blades 34 and such passed-over products contribute to lost performance within the engine 10.

The turbine shroud assembly 460 illustratively includes a metallic support ring 464, the turbine blade track 466, and a plurality of metallic segment retainers 468 as shown in FIGS. 2 and 10. The support ring 464 is coupled to the case 20 and includes a segmented outer carrier 469 and a segmented inner carrier 470 circumferentially located relative to one another by a pair of keys 471, 472. The turbine blade track 466 includes a plurality of blade track segments 474. The structure and arrangement of the turbine shroud assembly 460 is further discussed in U.S. Provisional Application No. 61/779,534 filed Mar. 13, 2013, hereby incorporated by reference herein.

Figures 11, 13, 15:
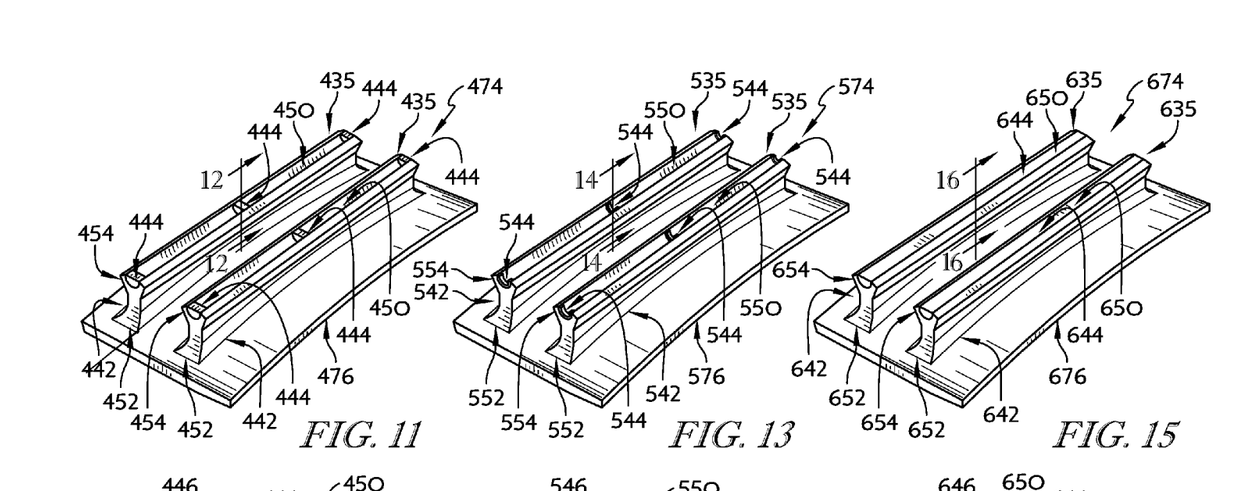
FIG. 11 is a perspective view of a blade track segment included in the turbine shroud assembly of FIG. 10.
FIG. 13 is a perspective view of another blade track segment adapted for use in the turbine shroud assembly of FIG. 2.
FIG. 15 is a perspective view of another blade track segment adapted for use in the turbine shroud assembly of FIG. 2.
Figure 12:
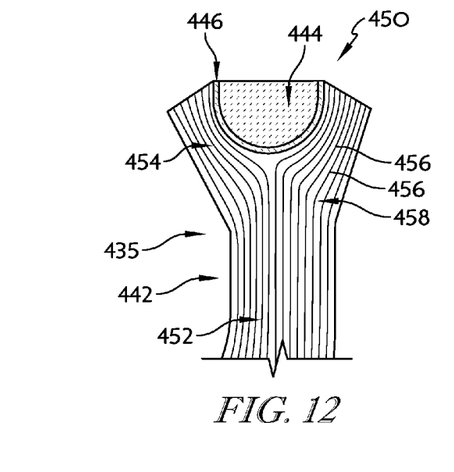
FIG. 12 is a cross-sectional view of a segment retaining feature included in the blade track segment of FIG. 11.

In the illustrative embodiment, each of the blade track segments 474 are coupled to the support ring 464 by pair of complementary retaining features 435, 477 as shown in FIGS. 2 and 10. Each blade track segment 474 includes a pair of segment retaining features 435 extending outward in the radial direction from the blade track runner 476 as shown in FIGS. 10 and 11. Complementary ring retaining features 477 are provided by the segment retainers 468. The ring retaining features 477 are configured to receive the segment retaining features 435 of each turbine blade track segment 474 to couple the blade track segments 474 to the support ring 464 as shown in FIG. 2. In the illustrative embodiment, the segment retaining features 435 and the ring retaining features 477 cooperate to form a dovetail-type retention system 485 when the segment retaining features 435 are inserted into the ring retaining features 477. In other embodiments, the retaining features 435, 477 of the blade track segments 474 and the segment retainers 468 may cooperate to form a fir-tree-type retention system or another suitable retention system.

Each segment retaining feature 435 is substantially similar to the blade retaining feature 35 described herein. Accordingly, similar reference numbers in the 400 series indicate features that are common between the segment retaining feature 435 and the blade retaining feature 35. Further the method of making the segment retaining feature 435 of the blade track segment 74 is similar to the method of making the retaining feature 35 the turbine blade 34 described herein. The description of the blade retaining feature 35 and the method of making the blade retaining feature 35 are hereby incorporated by reference to apply to the segment retaining feature 435, except in instances when it conflicts with the specific description and drawings of the segment retaining feature 435.

However, unlike the blade retaining feature 35, the post 442 of the segment retaining feature 435 extends outwardly in the radial direction from the integral turbine engine component it is connected to (e.g. the blade track runner 76). Additionally, the channel 450 extends through the head 454 perpendicular to the axis of engine rotation 11 and opens outwardly in a radial direction, facing away from the rest of the blade track segment 74.

Figure 14:
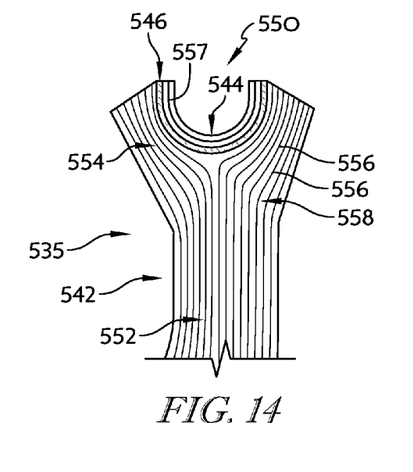
FIG. 14 is a cross-sectional view of a segment retaining feature included in the blade track segment of FIG. 13.

Another illustrative blade track segment 574 is shown in FIGS. 13 and 14. The blade track segment 574 is configured for use in engine 10 and is substantially similar to the blade track segment 474 shown in FIGS. 2 and 10-12 described herein. Accordingly, similar reference numbers in the 500 series indicate features that are common between the blade track segment 474 and the blade track segment 574. The description of the engine 10 and blade track segment 474 are hereby incorporated by reference to apply to the blade track segment 574, except in instances when it conflicts with the specific description and drawings of the blade track segment 574.

Unlike the blade track segment 474, the inserts 544 of the segment retaining feature 535 included in the blade track segment 574 are U-shaped as shown in FIGS. 13 and 14. Additionally, the fabric sheets 556 of the inserts 544 extend along walls of the channel 50 as shown in FIG. 14.

Figure 16:
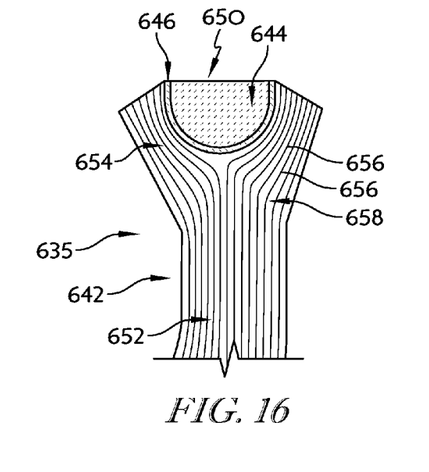
FIG. 16 is a cross-sectional view of a segment retaining feature included in the blade track segment of FIG. 15.

Another illustrative blade track segment 674 is shown in FIGS. 15 and 16. The blade track segment 674 is configured for use in engine 10 and is substantially similar to the blade track segment 474 shown in FIGS. 2 and 10-12 described herein. Accordingly, similar reference numbers in the 600 series indicate features that are common between the blade track segment 474 and the blade track segment 674. The description of the engine 10 and blade track segment 474 are hereby incorporated by reference to apply to the blade track segment 674, except in instances when it conflicts with the specific description and drawings of the blade track segment 674.

Unlike the blade track segment 474, the only one insert 644 is included in the segment retaining feature 635 included in the blade track segment 674 as shown in FIGS. 15 and 16. Additionally, single insert 644 is sized to extend along the entire channel 650 formed in the head 654 of the post 644. In other embodiments, the single insert 644 may be sized to extend along only a portion of the channel 650.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A retention feature for use in a gas turbine engine comprising
a ceramic post including a body adapted to be coupled to a turbine engine component and a head coupled to the body, the head formed to include a space that forms a channel opening away from the body and extending through the head of the ceramic post,
a first insert arranged in the space,
a first braze layer extending from the ceramic post to the first insert to bond the first insert to the ceramic post,
a second insert arranged in the space, and
a second braze layer extending from the ceramic post to the second insert to bond the second insert to the ceramic post, wherein the second insert is spaced apart from the first insert,
wherein the first insert is sized to fill a portion of the channel along an axis of the channel, the second insert is sized to fill another portion of the channel along the axis of the channel, and the second insert is spaced apart from the first portion of the channel along the axis.

2. The retention feature of claim 1, wherein the first insert is U-shaped and the second insert is U-shaped.

3. The retention feature of claim 1, wherein the first braze layer includes silicon.

4. The retention feature of claim 3, wherein the first braze layer includes a silicide.

5. The retention feature of claim 4, wherein the silicide includes at least one of zirconium, molybdenum, hafnium, boron, and carbon.

6. The retention feature of claim 3, wherein the first braze layer includes inert ceramic fibers.

7. The retention feature of claim 1, wherein the ceramic post consists essentially of a ceramic matrix composite and includes carbon and silicon.

8. The retention feature of claim 1, wherein the first insert consists essentially of a ceramic matrix composite.

9. The retention feature of claim 8, wherein the first insert includes silicon and carbon.

10. The retention feature of claim 8, wherein the first insert includes ceramic fiber fabric.

11. The retention feature of claim 8, wherein the first insert includes chopped ceramic fibers.

12. The retention feature of claim 1, wherein the body of the ceramic post has a proximal end coupled to an airfoil and a distal end coupled to the head and the airfoil includes a ceramic matrix material.

13. The retention feature of claim 1, wherein the body of the ceramic post has a proximal end coupled to a turbine blade track runner and a distal end coupled to the head and the turbine blade track runner includes a ceramic matrix material.

14. A retention feature for use in a gas turbine engine comprising
a ceramic post including a body adapted to be coupled to a turbine engine component and a head coupled to the body, the head formed to include a space,
a first insert arranged in the space, and
a first braze layer extending from the ceramic post to the first insert to bond the first insert to the ceramic post, wherein the first insert is U-shaped such that a gap exists between two opposed sides thereof.

15. A method of making a retention feature for use in a gas turbine engine comprising the steps of
manufacturing a composite post including a body and a head coupled to the body, the head formed to include a space that forms a channel opening away from the body and extending through the head of the ceramic post,
manufacturing a first insert,
arranging the first insert into the space formed in the head,
depositing a first braze layer between the head and the first insert to bond the first insert to the head,
manufacturing a second insert,
arranging the second insert in the space formed in the head at a location spaced apart from the first insert, and
depositing a first braze layer between the head and the second insert to bond the second insert to the head.

16. The method of claim 15, wherein manufacturing the first insert includes (i) preforming at least one ceramic fiber sheet into a predetermined shape and (ii) densifying the at least one ceramic fiber sheet.

* * * * *